March 12, 1940.  R. M. MAGNUSON  2,193,338

SPRAY RIG OR THE LIKE

Filed Oct. 7, 1936

INVENTOR.
Roy. M. Magnuson.
BY Philip A. Minnis
ATTORNEY.

Patented Mar. 12, 1940

2,193,338

UNITED STATES PATENT OFFICE 2,193,338

SPRAY RIG OR THE LIKE

Roy M. Magnuson, San Jose, Calif., assignor to Food Machinery Corporation, San Jose, Calif., a corporation of Delaware Application October 7, 1936, Serial No. 104,462

3 Claims. (Cl. 299—45)

My invention relates to counterbalanced power spray rigs of the type used in spraying of orchards and the like, and more particularly to an improved rig of the type referred to which is constructed to enable easy maneuvering in orchards, vineyards and the like, and to promote economical manufacture.

It is an object of my invention, therefore, to provide an improved counterbalanced spray rig having improved maneuvering qualities.

Another object of the invention is to provide an improved spray rig which is constructed to prevent undue injury to trees and vines by contact therewith.

Another object of the invention is to provide an improved counterbalanced spray rig having a convenient economical drive connection between the engine and the pump.

Another object of the invention is to provide an improved spray rig which attains the foregoing objects and which can be manufactured and assembled economically.

Other objects will appear from the following description of the preferred embodiments of my invention with reference to the accompanying drawing.

Figure 1:
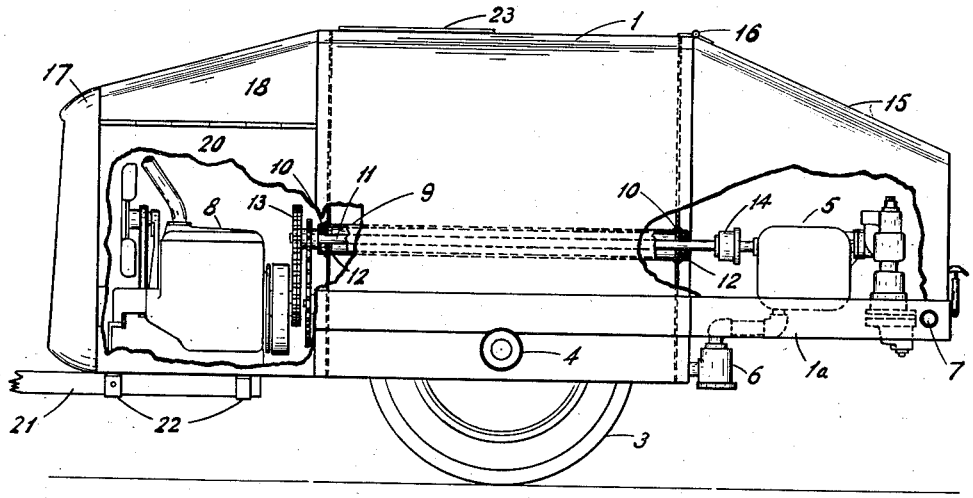
Fig. 1 is a side elevational view of a spray rig constructed in accordance with my invention, certain parts of the casing being broken away to show parts of the rig mounted within the body.

According to my invention, the spray rig is preferably provided with a single pair of supporting wheels which are located substantially centrally of the body, and a spray fluid supply tank which forms the frame of the rig and is positioned centrally of the body between the pump and the engine so that the rig is always counterbalanced irrespective of the amount of spray fluid in the tank, and so that such parts lie substantially in or closely adjacent the line of draft. Preferably, the drive connection from the engine to the pump extends through the tank to provide an efficient economical construction.

The preferred embodiment of my improved spray rig includes a frame comprising supply tank 1 on which the other parts of the rig are supported in counterbalanced relation with respect to the supporting wheels. To obtain a low center of gravity, the axis of rotation of the supporting wheels extends through the tank, and is positioned centrally with respect to the ends of the tank so that the amount of liquid in the tank does not affect the balance of the rig. Axle 2 having wheels 3 journalled on the ends thereof extends through and may be journalled or fixed in supporting tube 4. Tube 4 extends through tank 1 transversely of the rig, forming a transverse brace for the tank, and may be welded to the side walls thereof. If desired, however, stub axles attached to the sides of the tank may be employed. Cover 23 is provided for tank 1.

At one side of the tank 1 and rearwardly of axle 2 a suitable pump and regulator assembly 5 is mounted by longitudinal frame members 1a which are secured as by welding to either side of tank 1 and project beyond the ends thereof to support parts of the rig. Pump 5 communicates with the tank through inlet 6 and has outlets 7 for connection through hose or the like to spray nozzles. A source of power comprising engine 8 is mounted on frame members 1a forwardly of axle 2. Both pump 5 and engine 8 are mounted in a low position so that their centers of gravity are closely adjacent the line of draft, and by mounting them on opposite sides of the tank 1 as shown, they counter-balance each other so that the entire rig is balanced.

To enable a convenient, direct drive connection from the engine 7 to the pump, a conduit is provided through tank 1. For this purpose, tubular shaft housing 9 extends through the tank, being welded or otherwise secured to the walls thereof as at 10. The drive connection comprises shaft 11 extending through tubular housing 9 and journalled therein by suitable bearings 12. Shaft 11 is connected to engine 8 by chain drive 13, and drives pump 5 through a suitable flexible coupling 14.

To prevent injury to trees, vines and the like during maneuvering of the rig, both the pump and engine ends are inclosed by hoods or the like providing a smooth continuation of the tank. The pump end of the rig is inclosed by tapered hood 15 pivoted at 16 to the tank, while the engine end space is enclosed by radiator 17, fuel supply tank 18 mounted between tank 1 and radiator 17 above engine 8, and doors 20 pivoted to tank 18 and providing access to the engine. Both hood 15 and tank 18 are tapered downwardly and inwardly from tank 4 to facilitate maneuvering of the rig around and under trees and the like. The above construction is advantageous in production, since a spray rig for operation from the power take-off of a tractor or the like can be built by omitting the engine end of the rig, the other parts being identical except for the moving of draw bar 21 to the pump end of the rig.

Figure 2:
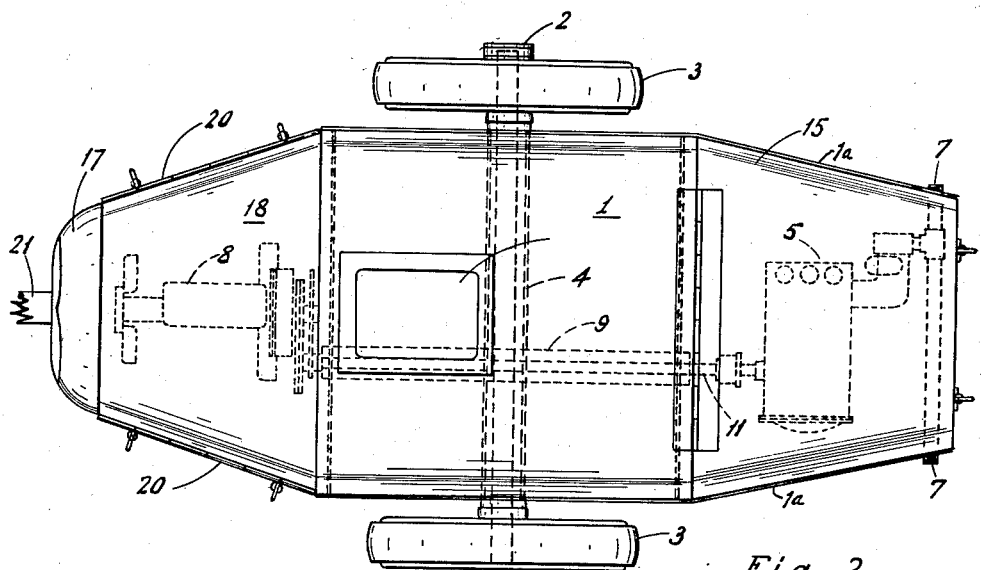
Fig. 2 is a plan view of the spray rig with certain parts indicated in dotted lines.
Figure 3:
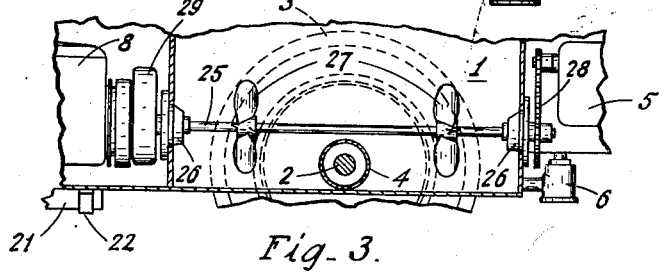
Fig. 3 is a fragmentary longitudinal section of a modified form of spray rig, the engine pump being shown in elevation.

Fig. 3 illustrates a modified construction similar in most respects to that described above. In this construction, however, the separate drive shaft from the pump to the motor is eliminated and the agitator shaft, which extends through the tank and is provided with paddles or the like for continuously agitating the spray liquid, is also used to transmit the drive from the engine to the pump. Agitator shaft 25 (Fig. 3) is journalled adjacent its ends by suitable bearings in bearing cages 26 mounted by bolts on tank 1. Within tank 1, paddles 27 are provided on shaft 25. One end of shaft 25 is connected by chain and sprocket drive 28 with pump 5, and the other end is connected through reducing gearing 29 with engine 8. Thus, the construction shown in Fig. 3, obtains the new and advantageous results noted in connection with the structure of Figs. 1 and 2, and in addition provides a more simplified and economical construction.

While I have illustrated certain preferred embodiments of my invention, it is to be understood that the invention can be embodied in other forms, and is capable of use in other types of apparatus having similar elements. Therefore, I consider myself entitled to all modifications and variations of the invention that fall within the scope of the claims appended hereto.

I claim:

1. A counterbalanced power spray rig comprising a pump, an engine for driving said pump, a tank between said pump and said engine, means supporting said pump and said engine on said tank at opposite ends thereof, respective closure means for said pump and said engine extending outwardly from said tank and substantially flush with the upper and side walls of said tank to form a smooth continuation of the tank walls, a drive connection from said engine to said pump extending longitudinally through said tank, and ground-engaging supporting means for said rig located centrally between the ends of said tank to maintain the counterbalanced condition of said rig irrespective of the amount of spray fluid in said tank.

2. A counterbalanced power spray rig comprising a pump, an engine for driving said pump, a tank between said pump and said engine, means supporting said pump and said engine on said tank at opposite ends thereof, respective closure means for said pump and said engine extending outwardly from said tank and substantially flush with the upper and side walls of said tank to form a smooth continuation of the tank walls, a tube extending longitudinally through said tank and providing a fluid-free passage therethrough, a drive connection from said engine to said pump extending through said tube, and ground-engaging supporting means for said rig located centrally between the ends of said tank to maintain the counterbalanced condition of said rig irrespective of the amount of spray fluid in said tank.

3. A counterbalanced power spray rig comprising a pump, an engine for driving said pump, a tank between said pump and said engine, means supporting said pump and said engine on said tank at opposite ends thereof, respective closure means for said pump and said engine extending outwardly from said tank and substantially flush with the upper and side walls of said tank to form a smooth continuation of the tank walls, an agitator shaft extending longitudinally through said tank and having one end connected to said pump and the other end connected to said engine to provide a drive connection therebetween, liquid agitating means carried by said shaft, and ground-engaging supporting means for said rig located centrally between the ends of said tank to maintain the counterbalanced condition of said rig irrespective of the amount of spray fluid in said tank.

ROY M. MAGNUSON.